US 6,579,338 B2

(12) United States Patent
Wertz et al.

(10) Patent No.: US 6,579,338 B2
(45) Date of Patent: *Jun. 17, 2003

(54) CONTROLLED RELEASE UREA-FORMALDEHYDE LIQUID FERTILIZER RESINS WITH HIGH NITROGEN LEVELS

(75) Inventors: Stacey L. Wertz, Conyers, GA (US); Lisa M. Arthur, Conyers, GA (US); George E. Mirous, Albany, OR (US); Kurt D. Gabrielson, Lilburn, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/893,468

(22) Filed: Jun. 29, 2001

(65) Prior Publication Data
US 2001/0049952 A1 Dec. 13, 2001

Related U.S. Application Data

(63) Continuation of application No. 09/395,212, filed on Sep. 14, 1999, now Pat. No. 6,306,194.

(51) Int. Cl.[7] ................................................. C05C 9/00
(52) U.S. Cl. ............................................ 71/30; 71/64.1
(58) Field of Search ......................... 71/30, 64.1, 64.11

(56) References Cited

U.S. PATENT DOCUMENTS

| | | | |
|---|---|---|---|
| 3,198,761 A | | 8/1965 | O'Donnell |
| 3,235,370 A | | 2/1966 | Kealy |
| 3,438,764 A | * | 4/1969 | Church ........................... 71/30 |
| 3,462,256 A | | 8/1969 | Justice et al. |
| 3,970,625 A | | 7/1976 | Moore et al. |
| 4,120,685 A | * | 10/1978 | Vargiu et al. ................... 71/30 |
| 4,123,570 A | | 10/1978 | Van Hijfte et al. |
| 4,145,207 A | * | 3/1979 | Moore ............................ 71/30 |
| 4,244,727 A | * | 1/1981 | Moore, Jr. .................... 71/64.1 |
| 4,526,606 A | | 7/1985 | Formaini |
| 4,554,005 A | | 11/1985 | Hawkins |
| 4,596,593 A | | 6/1986 | Tazawa et al. |
| 4,599,102 A | | 7/1986 | Hawkins |
| 4,776,879 A | | 10/1988 | Hawkins et al. |
| 4,778,510 A | * | 10/1988 | Hawkins ...................... 71/64.1 |
| 4,781,749 A | | 11/1988 | Moore |
| 5,043,417 A | | 8/1991 | Worsley et al. |
| 5,449,394 A | | 9/1995 | Moore |
| 6,048,378 A | * | 4/2000 | Moore ............................ 71/28 |
| 6,306,194 B1 | * | 10/2001 | Wertz et al. .................... 71/30 |

* cited by examiner

Primary Examiner—Wayne A. Langel
(74) Attorney, Agent, or Firm—Banner & Witcoff, Ltd.

(57) ABSTRACT

A controlled release liquid urea formaldehyde fertilizer which has a nitrogen level at least 31% and its method of manufacture.

11 Claims, No Drawings

CONTROLLED RELEASE UREA-FORMALDEHYDE LIQUID FERTILIZER RESINS WITH HIGH NITROGEN LEVELS

CROSS-REFERENCE TO RELATED APPLICATION

This is application is a continuation of U.S. patent application Ser. No. 09/395,212, filed Sep. 14, 1999, U.S. Pat. No. 6,306,194, entitled "Controlled Release Urea-Formaldehyde Liquid Fertilizer Resins with High Nitrogen Levels," which is hereby incorporated by reference in its entirety.

BACKGROUND OF THE INVENTION

1. Field of the Invention

The invention relates to a controlled release liquid urea-formaldehyde fertilizer which has a nitrogen level greater than about 31%.

2. Description of Related Art

Urea-formaldehyde based liquid fertilizers have been used for some time to provide nitrogen to the soil. It is desirable that such fertilizers be stable and provide a steady, evenly supplied, amount of nitrogen.

In the past, long term stability of high nitrogen (around 30%) liquid urea-formaldehyde fertilizers was achieved by forming either a high percentage (more than 30%) of cyclic triazone structures or by condensing the urea-formaldehyde resin into small urea-formaldehyde polymer chains.

Several patents issued to Hawkins describe the preparation of urea-formaldehyde resins having high triazone contents. U.S. Pat. No. 4,554,005 describes a reaction that produces at least about 30% triazone and has a preferred urea, formaldehyde, ammonia ratio of 1.2/1.0/0.28. U.S. Pat. No. 4,599,102 describes a reaction that produces at least about 30% triazone and has a urea, formaldehyde, ammonia ratio of 1.2/1.0/0.5. Both of these resins have a high percentage of ammonia. U.S. Pat. No. 4776,879 describes a reaction that produces at least about 75% triazone in water insoluble forms. This material is then crystallized out and re-dissolved at low solids levels for use. U.S. Pat. No. 4,778,510 describes a reaction that produces at least about 48% triazone. Nitrogen release from triazone is extremely slow, therefore, methylolated urea is preferred. The nitrogen is the useful part of the fertilizer to the plant and thus the higher the % of nitrogen, the more efficient the fertilizer.

Other patents describe condensing the resin into small chains. U.S. Pat. No. 4,781,749 to Moore reacts 1.5 to 2.5 mols formaldehyde per mole of urea in the presence of ammonium compounds such as ammonia. This initial mole ratio is below the initial mole ratio of 5 to 4 mols formaldehyde per mole of urea of the present invention. The pH is maintained at near neutral conditions (6.9–8.5) throughout the reaction. Condensed UF chains have lower solubility than methylolated ureas and could continue to advance, leading to extremely slow release.

U.S. Pat. No. 3,970,625 to Moore et al. describes a process for preparing urea-formaldehyde concentrates for use as slow release fertilizers or as adhesives. Urea and formaldehyde are mixed in a molar ratio of 1/4.4-7.3 with no more than 0.015 wt. % of ammonia present in the urea. The pH is adjusted to 8.8–9.5 and the mixture is heated to 50–60° C. for 30–60 minutes. Thereafter, water is removed by distillation under reduced pressure until solids comprise 60–90% of the remaining residue. For producing fertilizers, the residue is heated for another 48 hours at a temperature of 45–50° C.

U.S. Pat. No. 5,449,394 to Moore relates to liquid non-polymeric controlled-release nitrogen plant food compositions containing the condensation products of one part ammonia, two parts urea and three parts formaldehyde at a base buffered pH slightly above 7. The reaction is accomplished at a temperature of about 100° C. for 30–300 minutes. Water may be removed by evaporation until the nitrogen content of the formulation is between 20 and 30%. The solution is cooled before polymerization producing chains of more than 3 urea moieties can occur.

It is desirable to have a method of making a stable urea-formaldehyde resin suitable for fertilizer use that uses significantly less triazone and no condensation, and has a higher nitrogen concentration.

SUMMARY OF THE INVENTION

The invention describes a method of making a stable urea-formaldehyde resin suitable for fertilizer use which uses significantly less triazone than the Hawkins' process and no condensation reaction like the Moore processes, has a high nitrogen concentration, and yet is very stable, for instance, for at least two months at 25° C.

In particular, the invention is directed to a urea-formaldehyde resin prepared by the method comprising:
1) combining formaldehyde, urea, and ammonia in a basic solution at a formaldehyde/urea/ammonia ratio of about 5.4-3.6/1/0.45-0.65;
2) heating the solution to about 85 to about 95° C., and holding to ensure triazone formation;
3) cooling the solution to less than about 50° C., and adjusting the pH to about 9.5 to about 10.5;
4) adding sufficient urea and ammonia to the solution to change the ratios to about 1.1-0.6/1/0.11-0.08;
5) reheating the solution to about 80° C. to about reflux, at a pH of between about 9 and about 11, for about 1 to about 2.5 hours; and
6) post charging urea to bring the mole ratio to about 0.9-0.6/1/0.1-0.08;

wherein the nitrogen content of the resin is at least about 31% based on 100% resin solids.

DETAILED DESCRIPTION OF THE INVENTION

The present invention is directed to a controlled release liquid urea formaldehyde fertilizer prepared from a solution prepared by the reaction of formaldehyde, urea, and ammonia and having a nitrogen level at least about 31% and a final mole ratio of formaldehyde:urea:ammonia of about 0.9-0.6:1:0.1-0.08.

In accordance with the process of the present invention:
1) Formaldehyde, urea, and ammonia are combined in a basic solution at a formaldehyde/urea/ammonia ratio of about 5.4-3.6/1/0.45-0.65, preferably about 5.0-4.0/1/0.5-0.6, and most preferably about 4.8/1/0.54. The pH level of the basic solution is preferably about 7.5 to about 9.5, more preferably about 8 to about 8.6.
2) The solution is heated to about 85 to about 95° C., preferably about 88 to about 92, and held for about 10 to about 30 minutes, preferably about 15 to about 20 minutes, to ensure triazone formation.
3) The solution is cooled to less than about 50° C., preferably about 35 to about 45, and the pH is adjusted to about 9.5 to about 10.5, preferably about 9.8 to about 10.4.
4) Sufficient urea and ammonia are added to the solution to change the ratios to about 1.1-0.6/1/0.11-0.08, preferably about 1-0.7/1/0.1-0.09, and most preferably about 0.7/1/0.09.

5) The solution is reheated to about 80° C. to about reflux, preferably about 85 to about 95° C. at a pH of between about 9 and about 11, preferably about 9.5 to about 10.5 for about 1 to about 2.5 hours, preferably about 2 hours.
6) Urea is post charged to bring the mole ratio to 0.9-0.6/1/0.1-0.08.

The process of the invention provides triazone amounts of less than about 22 weight % based on 100% resin solids.

The pH may be maintained or adjusted by adding a compound, such as triethanolamine, borax, sodium or potassium bicarbonate, or sodium or potassium carbonate, preferably triethanolamine, at the start of the batch that will buffer the pH of the batch at the desired pH level. Alternatively, the pH may be maintained by any suitable base which is added during the reaction. While any base can be used to increase the pH of the reaction mix, preferably alkali metal hydroxides are used such as potassium hydroxide, lithium hydroxide, and sodium hydroxide.

Skilled practitioners recognize that the reactants are commercially available in many forms. Any form which can react with the other reactants and which does not introduce extraneous moieties deleterious to the desired reaction and reaction product can be used in the preparation of the urea-formaldehyde resin of the invention.

Formaldehyde is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in the practice of the invention. Typically, formalin solutions are preferred as the formaldehyde source. In addition, formaldehyde may be substituted in part or in whole with substituted aldehydes such as acetaldehyde and or propylaldehyde. Glyxal may also be used in place of formaldehyde as may other aldehydes not listed. It is to be recognized that the aldehyde is dissolved (solubilized) in water or other appropriate non-reactive organic of any desired or conventional nature, known in the art.

Similarly, urea is available in many forms. Solid urea, such as prill, and urea solutions, typically aqueous solutions, are commonly available. Further, urea may be combined with another moiety, most typically formaldehyde and urea-formaldehyde, often in aqueous solution. Any form of urea or urea in combination with formaldehyde is suitable for use in the practice of the invention. Both urea prill and combined urea formaldehyde products are preferred, such as Urea Formaldehyde Concentrate or UFC 85. These types of products are disclosed in, for example, U.S. Pat. Nos. 5,362,842 and 5,389,716.

Commercially-available aqueous formaldehyde and urea-containing solutions are preferred. Such solutions typically contain between about 10 and 35 percent formaldehyde and urea.

A solution having 35% ammonia can be used providing stability and control problems can be overcome. An aqueous solution containing about 28 percent ammonia is particularly preferred. Anhydrous ammonia may also be used.

In substitution in part or in whole, for the ammonia, any primary amine or substituted primary amine may be used such as methyl amine, monomethanol amine, amino propanol and the like. Further, difunctional amines may be used such and ethylene diamine or any combination of organic amines provided that one primary amine group is available to form the triazone ring. The reaction rates are much faster and more straight forward. Another reactant of interest is sodium sulfamate to make the cyclic urea sulfonate.

In a preferred embodiment of the invention, the urea-formaldehyde liquid fertilizer resins have a free urea content of 30–47%, a cyclic urea content of 15–22%, a monomethylol urea content of 6–12% and a di/trimethylurea content of 25–36% based on the urea-formaldehyde resin and, based on a 60–70% urea solution, a free urea content of 20–31%, a cyclic urea content of 9.9–14.5%, a monomethylol urea content of 4–8% and a di/trimethylurea content of 16–23% wherein the rest of the solution is composed of water, ammonia, and formaldehyde.

The urea-formaldehyde liquid resin of the invention may then be used as a fertilizer. Other additives may be mixed into the liquid fertilizer prior to use such as any of a wide variety of well-known inorganic fertilizer nutrients based on phosphorous and potassium. Pesticides may also be mixed in, e.g., to control weeds and kill insect larvae. Suitable additives are within the skill of the art.

The following examples are for purposes of illustration and are not intended to limit the scope of the claimed invention.

EXAMPLES

Example 1

Urea and formaldehyde were reacted in the presence of 1.6% ammonia to produce a product having a pH above 7 and containing urea-formaldehyde in a mole ratio of 0.64 (F/U).

|  | Conc. % | Weight % | Moles |
|---|---|---|---|
| UFC 85 | 85 | 35.3 |  |
| Formaldehyde (from UFC) | 100 | 21.2 | .71 |
| Urea (from UFC) | 100 | 8.8 | .15 |
| Ammonia | 28 | 4.8 | .08 |
| Urea | 100 | 57.1 | .95 |
| Ammonia | 28 | 1.0 | .02 |

|  | Mole Ratio |
|---|---|
| U/F | 1.6 |
| F/U | 0.6 |
| F/A | 7.4 |
| U/A | 11.5 |

NMR results indicated that the resin has a cyclic urea (triazone) concentration of 16.9% based on 100% resin solids.

The results are compared with the patents issued to Hawkins:

| U.S. Pat. No. | % Triazone | U/F/A Ratio |
|---|---|---|
| 4,554,005 | >30 | 1.6/1.0/0.28 |
| 4,599,102 | >30 | 1.2/1.0/0.5 |
| 4,776,879 | >75 |  |
| 4,778,510 | 48 |  |

The Hawkins patents have a high percentage of ammonia and a high triazone content which contains very slow nitrogen release.

Example 2

A urea-formaldehyde resin was prepared in accordance with the present invention in a three stage reaction and then compared with a resin prepared in accordance with Moore, U.S. Pat. No. 4,781,749.

Stage 1

|  | Invention | Moore (comparative) |
|---|---|---|
| U:F mole ratio | .21 | 0.4–0.67 |
| pH | 8.0–8.6 | 6.9–8.5 |
| Buffer | Triethanolamine | Sodium Bicarbonate |

Stage 2

|  | Invention | Moore (comparative) |
|---|---|---|
| U:F mole ratio | 1.42 | 1.0–1.7 (1.3–1.5) |
| pH | 9.8–10.4 | 6.9–8.5 |
| Buffer | pH maintained w/NaOH | Sodium Bicarbonate |

Stage 3

|  | Invention | Moore (comparative) |
|---|---|---|
| U:F mole ratio | 1.56 | No stage 3 |
| pH | 9.0–9.5 |  |
| Buffer | pH maintained w/NaOH |  |

The Moore patent describes a polymethylene urea fertilizer solution which is condensed at a neutral pH into small water soluble chains. Free urea and DMU are minimized due to the polymer formation and the high:formaldehyde mole ratio which allows Moore to get good long term stability on his solution. (28-0-0) solution.

The inventive resin was synthesized at high pH to eliminate the possibility of condensation and thus does not contain water soluble chains. The initial mole ratio differences also leads to a higher possibility of DMU, MMU, etc. formation. The inventive resin has a large amount of free urea in the solution which is soluble in the triazone formed early in the synthesis. The inventive resin also has a urea post-add to boost nitrogen concentration. (31.5-0-0 solution).

Example 3

Several liquid fertilizer solutions were tested including the commercial resin Nitro 30. The test results are shown in the table below.

|  | Nitro 30 | Inventive 1 | Inventive 2 |
|---|---|---|---|
| Nitrogen Conc. | 29.1 | 31.4 | 31.7 |
| Free Urea | 53 | 45 | 43 |
| Storage Stability | 2 months+ | 2 months+ | 2 months+ |
| Triazone Conc. | 11% | 16% | 12% |
| F/U Mole Ratio | 0.55 | 0.64 | 0.64 |

The nitrogen concentration was significantly higher for the Inventive 1 and Inventive 2 than Nitro 30. The free urea of Inventive 1 and Inventive 2 were lower than Nitro 30 which leads to more slow release nitrogen.

It should be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. A urea-formaldehyde liquid resin prepared by the method comprising:

1) combining formaldehyde, urea, and ammonia in a basic solution at a formaldehyde/urea/ammonia ratio of about 5.4-3.6/1/0.45-0.65;

2) heating the solution to about 85 to about 95° C., and holding to ensure triazone formation;

3) cooling the solution to less than about 50° C., and adjusting the pH to about 9.5 to about 10.5;

4) adding sufficient urea and ammonia to the solution to change the ratios to about 1.1-0.6/1/0.11-0.08;

5) reheating the solution to about 80° C. to about reflux, at a pH of between about 9 and about 11, for about 1 to about 2.5 hours; and 6) post charging urea to bring the mole ratio to about 0.9-0.6/1/0.1-0.08;

wherein the nitrogen content of the resin is at least about 31% based on 100% resin solids.

2. The urea-formaldehyde liquid resin of claim 1 wherein in 1) the formaldehyde/urea/ammonia ratio is about 5.0-4.0/1/0.5-0.6.

3. The urea-formaldehyde liquid resin of claim 1 wherein in 1) the pH level of the basic solution is about 7.5 to about 9.5.

4. The urea-formaldehyde liquid resin of claim 3 wherein in 1) the pH level of the basic solution is about 8 to about 8.6.

5. The urea-formaldehyde liquid resin of claim 1 wherein in 2) the temperature is about 88 to about 92° C.

6. The urea-formaldehyde liquid resin of claim 1 wherein in 2) the holding time is about 15 to about 20 minutes.

7. The urea-formaldehyde liquid resin of claim 1 wherein in 3) the solution is cooled to about 35 to about 45° C.

8. The urea-formaldehyde liquid resin of claim 1 wherein in 3) the pH is adjusted to about 9.8 to about 10.4.

9. The urea-formaldehyde liquid resin of claim 1 wherein in 4) wherein sufficient urea and ammonia are added to the solution to change the ratios to about 1-0.7/1/0.1-0.09.

10. The urea-formaldehyde liquid resin of claim 1 wherein in 5) the solution is reheated to about 85 to about 95° C.

11. The urea-formaldehyde liquid resin of claim 1 wherein in 5) the solution is reheated at a constant pH of between about 9.5 to about 10.5.

* * * * *